United States Patent [19]
Smith et al.

[11] 4,004,945
[45] Jan. 25, 1977

[54] BATTERY PLATE GRID

[76] Inventors: Carleton H. Smith, 34 North Drive, Islington; Kenneth G. Dunning, 413 Vancouver Crescent, Oshawa, both of Canada

[22] Filed: Feb. 6, 1976

[21] Appl. No.: 656,874

Related U.S. Application Data

[63] Continuation of Ser. No. 497,742, Aug. 15, 1974, abandoned.

[52] U.S. Cl. .............................................. 429/244
[51] Int. Cl.² ........................................ H01M 4/80
[58] Field of Search ............................ 136/36–67, 136/26; 29/2

[56] References Cited
UNITED STATES PATENTS

| | | | |
|---|---|---|---|
| 389,455 | 9/1888 | Elliott | 136/49 |
| 682,996 | 9/1901 | Pumpelly | 136/44 |
| 915,063 | 3/1909 | Bender | 136/38 |
| 1,198,066 | 9/1916 | Schonenmehl | 136/62 |
| 3,083,250 | 3/1963 | Geissbauer | 136/38 |
| 3,170,823 | 2/1965 | Geissbauer | 136/38 |
| 3,813,300 | 5/1974 | Shima et al. | 136/38 |

Primary Examiner—John H. Mack
Assistant Examiner—C. F. Lefevour
Attorney, Agent, or Firm—Fetherstonhaugh & Co.

[57] ABSTRACT

This invention relates to a battery plate grid of the type that are cast from lead and which have a perimeter frame and a lattice network of bars formed integrally with the frame. The plate grid has protuberances spaced apart on one side only of the lattice network and formed integrally therewith. The perimeter frame has a greater thickness than the lattice network and the principal plane of the lattice network is between the spaced apart planes of opposed face surfaces of the perimeter frame. The protuberances on one side of the lattice network have a height of about one-half the difference in thickness between the lattice network and the perimeter frame so that the outer extremities of the protuberances are in the plane of one face of the frame and serve to rigidify the lattice network during application of the paste. The tips of the protuberances only show at the surface of the paste when the grid is pasted so that there is provided a thin construction that has relatively little lead surface exposed at the surface of the paste.

2 Claims, 4 Drawing Figures

BATTERY PLATE GRID

This is a continuation of application Ser. No. 497,742, filed Aug. 15, 1974, now abandoned.

This invention relates to a storage battery plate grid and to a method for making a storage battery plate grid.

The conventional lead and acid storage battery that is widely used in automotive and related industries as a source of starting ignition and lighting power generally comprises a series of positive and of negative plates suspended in a suitable electrolyte. The plates comprise a lead plate gride which is covered with a lead oxide paste.

This invention is concerned with the grid construction and its manufacture including its coating with the paste. The invention is not concerned with the chemistry of the electrolytic reaction in the storage battery per se.

Plate construction for storage batteries is a highly developed art. The objective has been to produce a battery plate that is as thin as possible and that at the same time has sufficient strength to support the necessary amount of battery paste. It is also desirable that there should be as little as possible of the lead of the grid structure exposed at the surface of the paste because the exposed lead of the grid is undesirable from an electrolytic reaction point of view.

The commonly used grid for a storage battery plate comprises a frame which a lattice structure extending thereacross that holds the lead oxide paste. The lattice structure has a series of frames on each side thereof, the frames on one side being staggered with respect to the frames on the other side and the lead oxide paste being applied to the grid within these individual frames of the lattice structure. The edges of the frames are exposed at the surface of the grid plates so that there is a rather substantial amount of lead of the grid structure exposed. The grid structure is usually of a thickness in the order of 58/1000 of an inch and the thickness of the lattice work structure of the grid is usually the same the thickness of the perimeter frame.

Battery plates having a grid of this design have been used for many years, without improvement in basic design, that will permit the grid to be made of a lesser thickness or with a lesser amount of lead for a given paste carying capacity. They have also been manufactured by conventional casting techniques that are relatively expensive.

It is an object of this invention to provide a battery plate grid and a method of making a battery plate grid and a battery plate that will result in a battery plate of improved functional characteristics, that will require less lead in its manufacture for a given paste carrying capacity and that costs less to manufacture.

With these and other objects in view a battery plate grid according to this invention comprises a perimeter frame, a lattice network within said perimeter frame, said perimeter frame having a greater thickness than said lattice network, the principal plane of said lattice network being between the spaced apart planes of the opposed face surfaces of said perimeter frame, protuberances on one side of said lattice network of said grid, said protuberances having a height of about ½ the difference in thickness between said lattice network and said perimeter frame.

The battery plate grids are manufactured according to the invention by casting a series of grids between the continuous cylindrical patterned end surface of a rotating drum and a smooth surface cooperating shoe, said rotating drum being patterned to form said grids with one smooth side, with a perimeter frame and with a lattice network within said perimeter frame and with said perimeter frame of a greater thickness than said lattice network.

The invention will be clearly understood after reference to the following detailed specification read in conjunction with the drawings.

Figure 3:
FIG. 3 is a cross-section of a battery grid showing its condition as cast and before the lattice network is raised to locate the plane of the lattice network between the planes of the faces of the perimeter frame.
Figure 4:
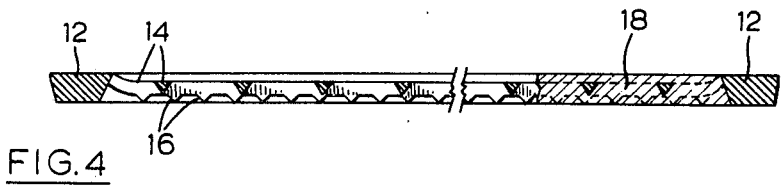
FIG. 4 is a cross-sectional view taken along the line 4—4 of FIG. 2 and illustrating the disposition of the paste.

Referring to the drawings, the numeral 10 generally refers to a battery storage plate grid of lead or lead alloy. This grid plate is "pasted" with a lead oxide paste to form a battery plate of a lead and acid type storage battery of the type commonly used for the ignition of automobiles, boats, etc. and FIGS. 3 and 4 are sectional views showing the grid as cast and as used respectively. These figures will be referred to in detail later.

It will be noted that the grid 10 comprises a perimeter frame 12. The bars of the lattice net work 14 preferably extend diagonally across the frame and they are of a lesser thickness that the perimeter frame 12 as illustrated in FIG. 4. The principal plane through the centre of the lattice network amd parallel to its two flat surfaces is disposed between the spaced apart planes of the opposed surfaces of the perimeter frame 12 as illustrated in FIG. 4. (FIG. 3 is a view illustrating a stage in the manufacture.)

Protuberances 16 extend from one side of the lattice network 14 at the intersections of each of the bars of the lattice network. The outer extremities of these protuberances lie substantially in the plane of one side of the perimeter frame 12.

The protuberances serve as locating devices in the manufacture of the grid and they serve to rigidify the grid as the lead oxide paste 18 is applied as will be explained later.

When the grid is pasted the only parts of the lattice network of the grid that are visible, are the tips of the protuberances.

The bars of the lattice network preferably have a thickness of about 25/1000 of an inch and the perimeter frame portion of the grid preferably has a thickness of about 40/1000 of an inch. It has been found that a grid of these dimensions will hold an equivalent amount of lead oxide paste to a conventional grid of about 58/1000 of an inch thickness and expose substantially less lead at the surface of the oxide paste. The overall dimensions of the grid are not critical. Five and one quarter inches high and five and seven eighths inches long is a common size. They can be varied as required but the important thing about the grid is that it is capable of holding an equivalent amount of paste as a conventional grid with less lead in its construction and with less lead exposed at the surface of the paste.

Figure 1:
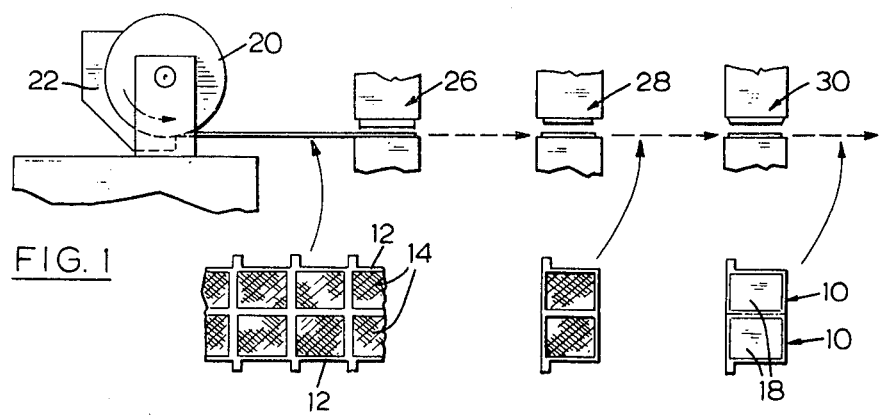
FIG. 1 is a schematic illustration of steps in the making of a battery plate according to this invention.
Figure 2:
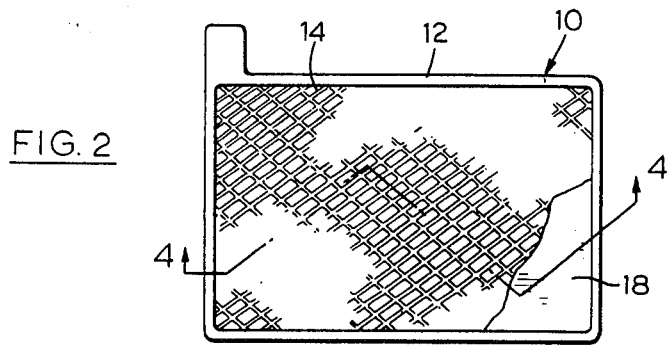
FIG. 2 is an illustration of a battery plate according to this invention with portions of the lattice network omitted for drafting convenience, as viewed from the smooth side of the grid.

FIG. 1 of the drawings schematically illustrates the method of making battery grid plates and for pasting them.

The grid plates are cast by a continuous casting method between a continous cylindrical patterned surface of a rotating drum 20 and a smooth surfaced cooperating shoe assembly 22. The casting machine for achieving this operation is one where molten lead is continuously fed into the moulding space defined by the patterned surface of the rotating drum and the smooth shoe. A machine capable of achieving this operation is described in Canadian Pat. No. 934,522 dated Oct. 2, 1973. A machine is not described in detail in this application.

The output of the moulding machine is a continuous series of grid formations two abreast and interconnected at their perimeter frame portions by a weakened line.

The moulding machine is operated on a continuous basis. The grid structures continuously progress from the output thereof to a cropping station 26 where they are severed transversely of their direction of flow to separate pairs of battery plates by means of an intermittently operating press.

The grid structures then proceed to station 28 where they are turned over and indexed under a press that has a boss thereon that is of a size to substantially cover the lattice network portion. It is caused to move downwardly against the lattice network portion of the grid structures to depress the grid structure to the position shown in FIG. 4. The downward movement of the press is limited by the engagement of the protuberances 16 with the underlying support surface for the grid structures.

When the grid structures leave the casting machine the cross-section of the grid structures is as illustrated in FIG. 3, it will be noted that the bottom surface of the lattice network is co-planar with the bottom surface of the perimeter frame. This is the surface that is cast against the smooth shoe. This surface is turned to be face up as it passes under the press 28 and is depressed by the press 28 to achieve the disposition illustrated in FIG. 4 wherein the principal plane of the lattice network lies substantially between spaced apart planes of the opposed faces of the perimeter portion of the grid.

As noted, the protuberances 16 are designed with a height of about one-half the difference in thickness between the lattice network portion and the perimeter frame portion of the grid so that when depressed, the principal plane of the lattice network will lie about mid-way between the face portions of the perimeter frame.

With a casting machine of the type indicated in Canadian Pat. No. 934,522, the grid structure are preferably turned over before they are pressed. This turning over operation would not be necessary with a machine of the type where the moulding machine drum rotates in the opposite direction and the grid structures come out from the top of the drum with the smooth side down.

After the principal portion of the lattice network has been depressed, the grid structures are conveyed to station 30 wherein paste is applied to the grid within the perimeter frame. The disposition of the paste is indicated by the numeral 18 of FIG. 4 of the drawings. The protuberances 16 also serve to locate the grid within the oxide paste. By applying a force on a pasted plate towards the upper face of the lattice work network of the grid as shown in FIG. 4, and supporting the lower face on a flat surface the protuberances 16 remain aligned as shown in FIG. 4. This ensures that the lattice work remains aligned after the pasting operation.

The cropping operation at station 26, the pressing operation at station 28 and the pasting operation at station 30 are not described in detail. They are capable of almost infinite variation by a person skilled in the art. The important thing about the invention is the sequence of operations as a whole which consists of the forming of the grid structure in a moulding machine of a type indicated wherein the output is flat on one side and irregular on the other side, depressing the lattice work grid portion to locate its principal plane within the frame and subsequently filling the space between the frame with paste. The grid can be manufactured with less lead, exposes less lead at the surface of the paste, gives better support to the lead oxide because the lattice work support structure is better embedded in the oxide paste and is cheaper to manufacture. The protuberances are an aid to accurate location of the grid structure between the perimeter frame but the location might be achieved by co-operating platens of a press and it is intended that such an alternative should be within the scope of the method claims.

The embodiments of the invention in which an exclusive property or privilege is claimed are defined as follows:

1. A lead battery plate grid for a lead acid battery comprising a lead perimeter frame, a lead lattice network of intersecting bars formed integrally with and within said perimeter frame, protuberances spaced apart on one side only of said lattice network and formed integrally therewith, said perimeter frame having a greater thickness than said lattice network, the principal plane of said lattice network being between the spaced apart planes of opposed face surface of said perimeter frame, said protuberances on said one side of the said lattice network of said grid having a height of about ½ of the difference in thickness between said lattice network and said perimeter frame whereby the outer extremities of said protuberances are in the plane of one face surface of said frame.

2. A battery plate grid as claimed in claim 1 wherein said protuberances are located at the intersections of the bars of said lattice network.

* * * * *